United States Patent [19]
Tattersall et al.

[11] Patent Number: 5,920,267
[45] Date of Patent: Jul. 6, 1999

[54] RING NETWORK SYSTEM

[75] Inventors: David Tattersall; Ian Jackson; Peter Quinn; Gerald Van De Poll; Malcolm Lewis, all of Dublin, Ireland

[73] Assignee: Europlex Research Limited, Dublin, Ireland

[21] Appl. No.: 09/013,467

[22] Filed: Jan. 26, 1998

Related U.S. Application Data

[63] Continuation of application No. 08/437,055, May 9, 1995, abandoned.

[30]     Foreign Application Priority Data

May 9, 1994 [IE] Ireland ................................. S940380

[51] Int. Cl.⁶ ..................................................... H04Q 3/00
[52] U.S. Cl. ............................... 340/825.05; 340/825.52; 370/400
[58] Field of Search ........................ 340/825.05, 825.07, 340/825.08, 825.52, 825.63; 370/400, 403, 404

[56]               References Cited

U.S. PATENT DOCUMENTS

| 4,700,018 | 10/1987 | Kerschner et al. . |
| 4,982,400 | 1/1991 | Ebersole . |
| 5,049,871 | 9/1991 | Sturgis et al. ..................... 340/825.05 |
| 5,140,586 | 8/1992 | Kloper et al. ........................... 370/452 |

FOREIGN PATENT DOCUMENTS

| 0354809 | 2/1990 | European Pat. Off. . |
| 0549992A1 | 12/1992 | European Pat. Off. . |
| 3815779A1 | 5/1988 | Germany . |
| 3838152A1 | 10/1988 | Germany . |
| 2064919 | 10/1983 | United Kingdom . |
| WO9300756 | 1/1993 | WIPO . |

OTHER PUBLICATIONS

IBM Technical Disclosure Bulletin, vol. 15, No. 2, Jul. 1972 New York US, pp. 380–382.

*Primary Examiner*—Edwin C. Holloway, III
*Assistant Examiner*—Edward Merz
*Attorney, Agent, or Firm*—Jacobson, Price, Holman & Stern, PLLC

[57]                ABSTRACT

A ring network system (1) has at least one node M which acts as a master or sender node to transmit an outgoing signal (O.S.1) having a relative address determined according to the relative location of the addressee node in the system. As the outgoing signal passes through each node in turn, it is changed and a node recognizes that it is the addressee node if the relative address has a predetermined common addressee value. The addressee node generates a return signal (R.S.1) with a node identifier which is transmitted in the opposite direction to the outgoing signal and the sender node ensures that this is received for a valid poll. The master node (M) may automatically configure itself by retrieving the identifier of all nodes in response to outgoing signals. This allows nodes to be easily added or deleted. Each node on the return path adds data which it has captured together with its identifier so that data may be captured from all nodes between the sender node and the addressee nodes. A node (M) may transmit outgoing signals alternately in opposite directions in a manner whereby the addressee nodes are selected so that each communication link (3–8) is omitted in sequence and fault diagnosis takes place.

11 Claims, 3 Drawing Sheets

RING NETWORK SYSTEM

This is a continuation of application Ser. No. 08/437,055 filed May 9, 1995, now abandoned.

INTRODUCTION

1. Field of the Invention

The invention relates to a ring network system of the closed loop type having a number of nodes interconnected in a ring configuration whereby individual nodes capture data and communicate it with at least one master node. Examples of such systems are building management or alarm systems whereby the captured data is sensed by sensors.

2. Prior Art

U.S. Pat. No. 5,049,871 (American Magnetic Corporation) describes a loop transmission system in which a central processor transmits signals in alternative cycles in opposite directions, to nodes of the system. Each node is adapted to respond in a direction opposite to the direction of the command transmission. Accordingly, if a fault occurs, a command may be transmitted in the opposite direction to ensure fault tolerance.

The feature of transmitting signals in opposite directions around a loop or ring network is also described in British Patent Specification No. GB 2,064,919 (STC). In this system, each node has a reversible repeater whereby the direction of the signal transmission automatically changes in a cyclic manner. Setting of the direction for each cycle is according to whether or not there is a fault in the system.

While both of the above systems appear to be quite effective, the inventors have found that problems can arise for data capture in very large systems which can have upwards of 250 nodes. In such a system, the three main requirements are:

1. flexibility whereby nodes may be added or deleted in a simple manner,
2. simplicity of construction, and
3. high speed of operation whereby captured data may be quickly recorded and acted upon.

It is also known in the art (such as EP 354,809) to provide a Token Ring™ (IBM) network which uses a token identifier tag attached to each transmission signal. This token is checked by each node in turn to determine the correct destination node and is retrieved from the network only by the addressee node. While networks of this type are highly suitable for broadcast transmissions sent to every node on the network by using a general token, they are not suitable for applications where node arrangements are frequently changed requiring network re-configuration. Use of such networks is also limited in that the physical distance between nodes is limited.

In the Token Ring™ (IBM) and other prior art systems, it is necessary to program nodes with the addresses of nodes which are added to the system and this can be a time-consuming task and can, in some instances, lead to errors.

Another approach to construction of a ring network system which is fault-tolerant is described in PCT Patent Specification No. WO 93/00756. In this system, there are cross-connects to establish fault tolerance. This adds a significant degree of hardware complexity to the system. Further, the operating speed of the network will suffer.

OBJECTS OF THE INVENTION

An object is to provide a system which is flexible in operation whereby nodes may be added or deleted in a simple manner. A still further object is that the system be capable of handling signals of different types in a simple manner, and that the system may be spread over a large physical area.

Another object of the invention is to provide for efficient and fast communication of data which is captured at individual nodes of a ring network system.

SUMMARY OF THE INVENTION

The invention provides a ring network system in which there are nodes which can capture data which is to be communicated over links which interconnect the nodes in a ring configuration. At least one sender node has a control means to:

transmit an outgoing signal to an addressee node, the signal having a relative address determined according to the relative location of the addressee node in the ring network, and receive a return signal from the addressee node, read an addressee node identifier and read captured data incorporated in the return signal.

Each node has a data transfer means to receive an outgoing signal, monitor the relative address and determine if it is the addressee node. The outgoing signal is re-transmitted to the next node if it is not the addressee. If it is the addressee, it transmits a return signal to the sender node through nodes of the system in a return path, said return signal including captured data and its identifier.

By virtue of the fact that a sender node does not need to know the identifier of an addressee node, very little time input is required for setting-up the system. The sender node can simply address each node location in turn or choose to address any node according to its location and monitor the identifier which is returned with the return signal. This leads to a large degree of flexibility. The sender node may then perform automatic configuration by updating a table correlating node locations with identifiers retrieved in response to polling signals sent to all nodes. There is therefore no need for an installer to configure the sender node - he simply installs a new node having a programmed identifier.

Preferably, the data transfer means of each node is constructed to change the relative address if it is not at a pre-set addressee value, and to recognise that it is the addressee if the relative address has the addressee value. Such changes may, for example, take the form of the relative address being a count value and each successive node decrementing the count until the pre-set addressee value is reached.

By virtue of the fact that each node changes the relative address of an outgoing signal, the relative address is always maintained with the correct relative value. For example, at any location on the system its value will indicate the relative position of the addressee node with respect to the signal location. Further, each node can immediately recognise that it is not the addressee node by simply checking for a common and fixed addressee node value so there is therefore no need for it to check for an associated unique address. This leads to fast operation of the network.

In another embodiment, the invention provides for the data transfer means of each node adding captured data to a return signal generated by another node as it passes through the node. Accordingly, a single outgoing signal transmitted from a sender node to an addressee node can result in data being captured from all of the intervening nodes. This significantly improves performance of the system, particularly where the application is a control system in which the volume of data is low but speed is important. Examples of control systems are alarm systems, machine control systems, lighting control systems and building control systems generally. The relative address may be used to indicate that the signal is a return signal, the relative address having a common return signal value which is immediately recognised by each node so that the return signal is immediately re-transmitted to the next node on the return path for simple and fast communication.

BRIEF DESCRIPTION OF THE DRAWINGS

The invention will be more clearly understood from the following description of some embodiments thereof, given by way of example only, with reference to the accompanying drawings, in which.

DETAILED DESCRIPTION OF THE INVENTION

Figure 1A:
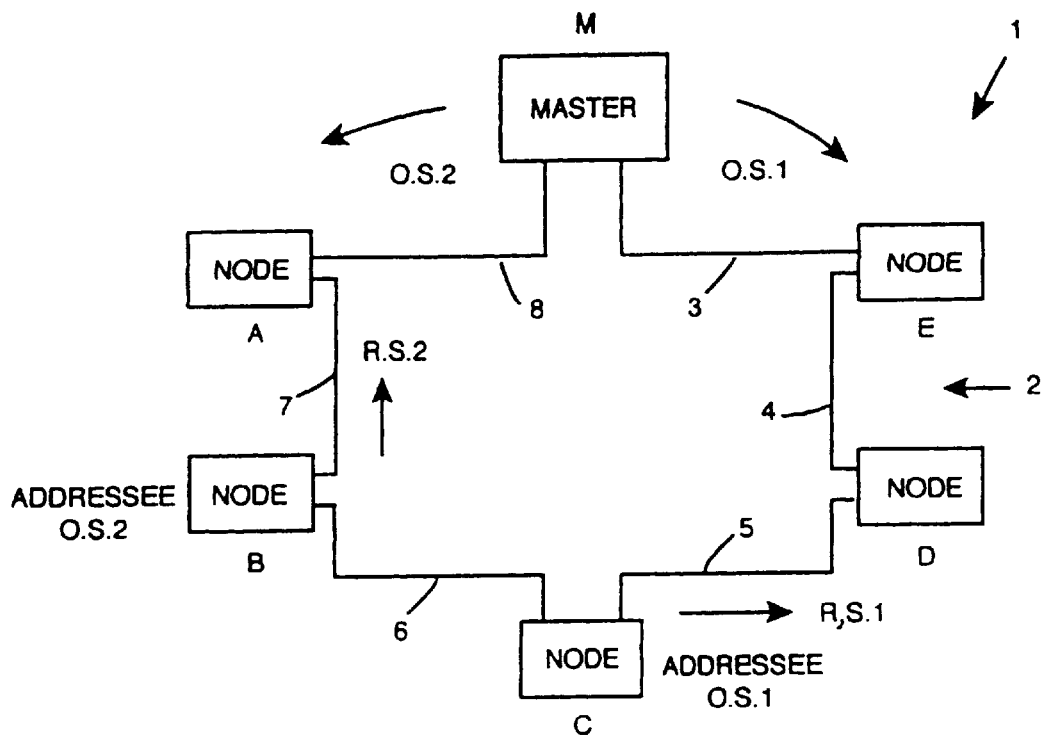
FIGS. 1(a) and 1(b) are schematic views of a ring network system of the invention in different modes of operation.
Figure 1B:
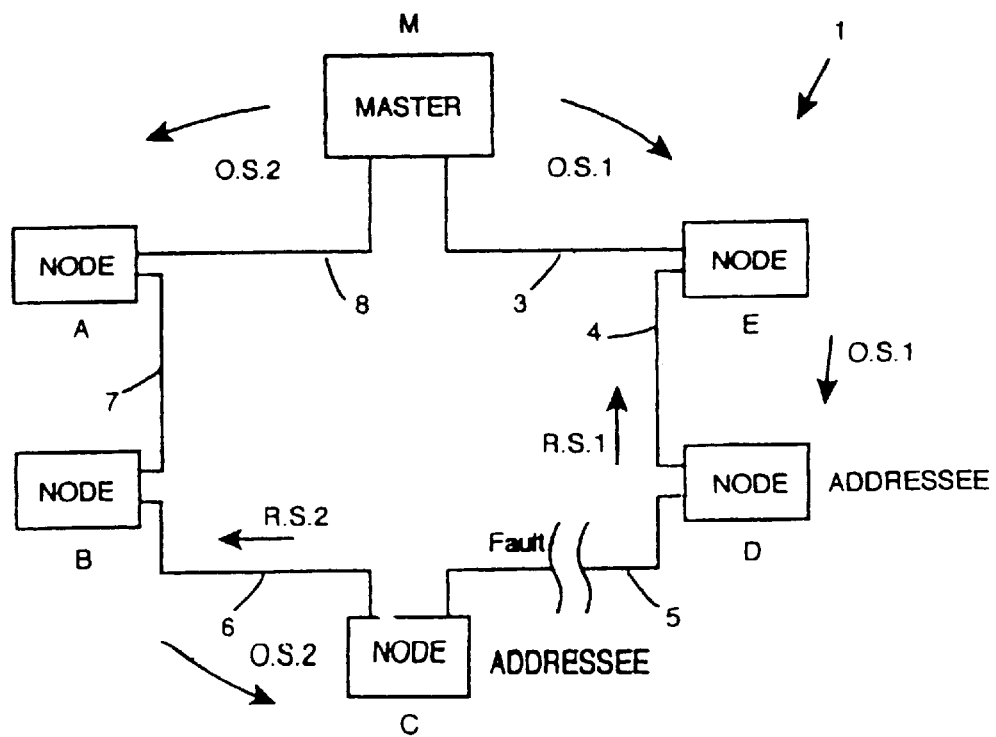
Figure 2:
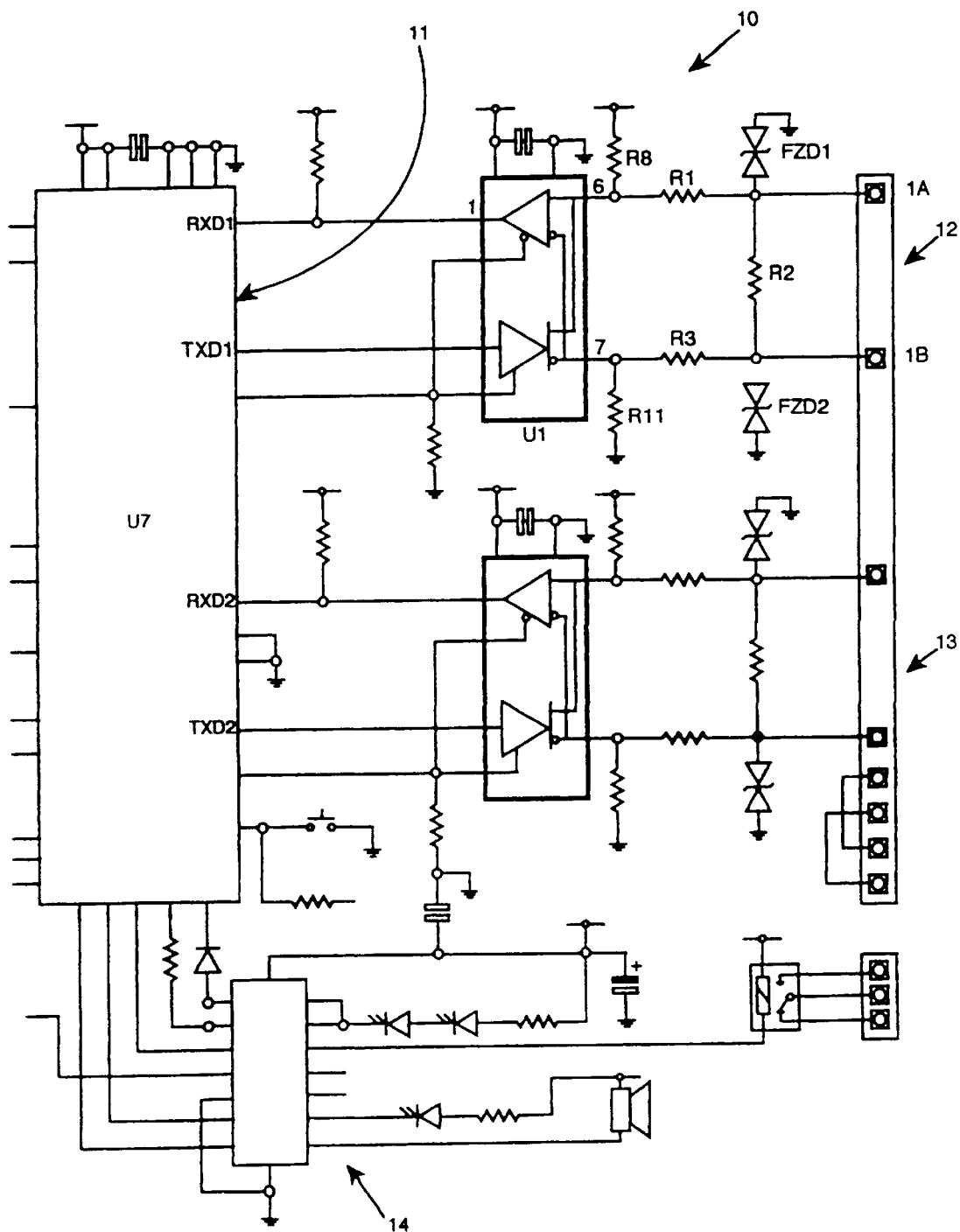
FIG. 2 is a circuit diagram showing a processing and communication circuit of a node of the system.

Referring to the drawings, and initially to FIGS. 1(a) and 1(b), there is shown a ring network system 1 of the invention. The system 1 is, in this embodiment, a control system having nodes which capture data by use of alarm sensors. This captured data must be communicated in the network. In addition, nodes can receive command signals which are acted upon, such as alarm re-setting conditions.

The system 1 comprises bi-directional network links 2 which interconnect a set of nodes. For clarity, the network 1 only has six nodes, although in practice it may have up to 256 or indeed in excess of 256 nodes. The nodes which are illustrated are a sender or master node M and a set of slave nodes A, B, C, D, and E. In the clockwise direction from the master node M, there are six network links 3, 4, 5, 6, 7 and 8. The system 1 may be spread over a wide physical area with up to 1 km between nodes.

In more detail, each node comprises a data processing and communication circuit 10. The circuit 10 comprises a processor 11 and RS485 ports 12 and 13. Operation of each port is identical and accordingly description of the port 12 is sufficient. This port includes a receive terminal 1(a) and a transmit terminal 1(b) and protection diodes FZD1 and FZD2. These provide transient protection. A resistor combination R1/R3 provides transient and current protection. The resistors R8 and R11 operate to pull the signal value down if there is no signal present whereby pin 1 of a buffer amp. U1 is high if there is no signal present. The port 12 operates by presenting a differential voltage across R2 which appears at the pins 6 and 7 of the amp. U1 and is inputted as a signal at a processor pin RXD1.

The processor 11 (U7) is of the Hitachi H8520 type, although any microprocessor or microcontroller having suitable i/o ports and a clock speed close to or exceeding the clock speed of U7, namely 19.6608 MHz would be suitable. The processor 11 operates to receive the signal via RXD1 or alternatively RXD2 and to carry out various data processing operations. It then re-transmits a signal via the buffer amp. U1 and TXD1 or TXD2 so that it acts as a repeater. The signal which is transmitted is via the port 12 or 13 other than that on which the signal was received. Because the buffer amplifier U1 acts as a repeater, the nodes may be up to 1 km apart—thus providing a good deal of flexibility for physical installation.

The level of data processing is generally extremely low for many operations, however, it can be complex where this is necessary. These aspects are described in more detail below. The circuit 10 also comprises a driver circuit U9. Other circuit components which are connected to the circuit 10 and which are not illustrated include a non-volatile memory, an infrared receiver and a reset and power control circuit.

Another aspect to the system 1 is that users can communicate with individual nodes using an infrared user interface, referred to as an IR module. The manner in which an individual node communicates with the IR module is set by the master node M. Data is transmitted to the IR module using pulse-distance modulation. Null start or stop bits are required. Bits are presented by 500 microseconds of carrier at 38 kHz followed by a null carrier. The length of the null carrier determines the dibits being sent. In this way, the "on" time for the transmitting IR device is minimised, thereby maximising power efficiency. Each dibit is modulated by a 38 kHz carrier and every message is preceded by 9 ms of continuous carrier followed by a 4.5 ms pause. This is to level the internal control links and the receiver modules.

The master node M includes other data processing and interfacing circuits for additional functions. However, it is envisaged that the circuit 10 may be used by any node to act as a master node, particularly where fault tolerance is required and a different node is required to both transmit command signals to other nodes and to retrieve captured data for further processing. The processor 11 used in each node has these capabilities.

Before describing the messaging structures and protocols in detail, operation of the system 1 is now described. It is the master node M which initiates communication sessions with other nodes. This is for retrieval of data which is captured at the nodes. However, it also has the purpose of transmitting commands to the nodes, such as a global command.

The processor 11 in the master node M is programmed to act as a control means to transmit an outgoing signal to an addressee node of the system 1. The outgoing signal has a relative address which is determined according to the relative location of the addressee node in the ring network. The relative address is a count value, being the number of nodes which the outgoing signal must pass through, including the addressee node. Clearly, any other suitable value could alternatively be used.

The processor 11 of each of the nodes A to E is programmed to act in conjunction with the serial ports 12 and 13 as a data transfer means to receive and process an outgoing signal. When the signal is received, the processor 11 automatically monitors the relative address and determines if it is the addressee node. This is achieved in an extremely simple manner. If the relative address count value is greater than 1, then the processor 11 immediately recognizes that its node is not the addressee and therefore decrements the value of the address by 1. The outgoing signal is then passed on with the new relative address to the next node in the outgoing signal path. Accordingly, the relative address is dynamically maintained in real time. At each successive node, the value of the relative address is decremented by 1 until the value is a pre-set common addressee value of 1. When a node detects a relative address of this value, it knows that it is the addressee node. It then reads the data and/or commands in the outgoing signal and acts upon them. The outgoing signal will most often be simply a polling request for retrieval of captured data, in which case the addressee node generates a return signal which contains the captured data. The addressee node may therefore be referred to as an "echo node" in this context.

The return signal is transmitted by the other of the ports 12 or 13 in the opposite direction to the outgoing signal back to the master node M. The relative address of the return signal is a pre-set common return signal value of 0. As each node on the return path detects that the value is 0, it knows that the signal is a return signal and passes onto the next node in the return path without changing the relative address. When generating the return signal, the addressee node includes a unique node identifier so that the master node M knows the source of the return signal. As the return signal passes through each node on the return path, each node may add captured data together with its unique identifier onto a data stream part of the return signal.

Re-transmission of both the outgoing and the return signals is very quick as the signal is not stored. The processor 11 simply detects which port 12 or 13 the signal was received on and immediately decrements the count value, if appropriate, and re-transmits the signal. The delay may be 1 byte if the relative address contains only a 1 byte count value. However, the relative address may also include an inverse byte for verification purposes so that each processor 11 can discriminate noise. Where the system is to include more than 256 nodes, there may be 4 bytes, 2 count value bytes and 2 inverse bytes. Of course, if the clock speed of the nodes is extremely high, it may not be necessary to route the signals so quickly.

An important point is that the master node M does not need to know the unique identifier when generating an outgoing signal—it just specifies the node location. Indeed, the relative address is not an address in the conventional sense as it is not the address of a node—it instead governs how many nodes the signal should pass through before a node determines that it is the addressee. The master node can operate to automatically update a table in non-volatile memory which correlates node locations with identifiers by polling every node location and logging the identifier in the return signal. This leads to enormous flexibility as nodes may be easily added or deleted—the master node performing automatic configuration. Accordingly, the installer just connects the node at the desired location and ensures that it has a programmed identifier.

Referring to Fig. 1(a), an outgoing signal O.S.1 is transmitted in the clockwise direction from the master node M. This signal traverses the communication links 3, 4 and 5 via the nodes E and D until it reaches the addressee node C. Accordingly, the relative address will have a count value of decimal 3 which is decremented to decimal 2 by the node E and decremented to decimal 1 by the node D. When the node C receives the outgoing signal O.S.1, it detects that the relative address has a value of decimal 1 and therefore knows that it is the addressee node. The node C therefore processes the signal and generates a return signal R.S.1 containing its identifier and the relevant return information. The outgoing signal O.S.1 may include commands instructing the node C in some aspect of its operation such as setting alarm threshold levels. When the master node M receives the return signal R.S.1, it knows that the outgoing signal has been acted upon by the node C and can register this fact. It then proceeds in the next cycle to transmit an outgoing signal O.S.2 in the anti-clockwise direction through the communication links 8 and 7 and the node A. In this case, the relative address has a value decimal 2 which is decremented to decimal 1 by the node A and therefore the node B recognizes the fact that it is the addressee node. It generates a return signal R.S.2 on the return path through the communication links 7 and 8 and the node A.

It will be noted that the communication link 6 has been omitted in this full cycle of outgoing signals O.S.1 and O.S.2. However, in the next cycle, the master node M omits the next link 7 by issuing two outgoing signals in opposite directions with the nodes A and B as being the two addressee or echo nodes. It operates in sequence to omit each communication link in turn. The master node M is programmed to monitor the return signals and to record a diagnosis history of faults arising in the return signals. It can therefore establish in memory a pattern of faults and relate this pattern to individual communication links for fault diagnosis and generation of fault reports. In this way, the master node M may in the course of its normal operation, gather together enough information for location of intermittent faults. Intermittent faults are the most difficult to detect in network systems.

If a fault does arise, such as a break in the link 5 as shown in Fig. 1(b), then the nodes D and C are automatically set to be the addressee nodes for the respective outgoing signal directions. In this way, all nodes are accessed despite the fact that there is a fault. The master node M is programmed to generate an error output at its interface to indicate the fault location. Another feature of the master node M is that it performs automatic configuration operations immediately upon detection of a fault to check if addition or deletion of a node is the reason for the fault. When a fault is signalled, a maintenance person can easily interrogate suspected nodes using the IR module and thus very quickly identify a physical fault location. This is very important for complex systems.

Another important feature of the system 1 is that the processor 11 of each node is programmed to add captured data onto a return signal which passes through the node. Accordingly, immediately when the processor 11 detects that the relative address count value is 0, it adds its captured data to the data stream of the return signal before re-transmitting it to the next node on the return path. Therefore, in the cycles shown in Fig. 1(a), the return signal R.S.1 retrieves data from the nodes C, D, and E. Similarly, the return signal R.S.2 includes data captured at the nodes B and A. This is very important in providing for a high-speed operation of the system 1 in that a single outgoing signal results in return of data from all nodes between the sender node and the addressee node. The master node M may specify in a destination group address (DGA) field of the outgoing signal which intervening nodes may add captured data.

The outgoing signal need not necessarily be for retrieval of captured data. It may include commands from the master node M or indeed, from any other sender node. The outgoing signal may be a global command signal which is acted upon by all nodes, or alternatively, it may be specific to a particular addressee node, addressing being carried out as described above. Examples of a global command signal may be a signal for synchronisation of clocks or alternatively activation of alarm output devices. Where the outgoing signals includes commands, the return signal may indicate errors which arise when the node attempts to act in response to the command signal. For commands, the relative address is used as described above, however, the DGA field may specify that intervening nodes should act upon the commands also.

In more detail, the nodes of the system will operate at 0–5 V signal levels with receiver input impedance of at least 12 K Ohms, input sensitivity of at least ±200 mV and input hysteresis of 5 mV. The receiver common node range is −7 V to +12 V at a minimum. The transmitter section can supply a minimum of 20 mA to the communication lines via the ports 12 and 13 so that it acts as a repeater and is capable of operation at up to 307200 baud.

The processors 11 in the various nodes are programmed to transmit the outgoing and return signals as described above using the relevant ports 12 and 13. Where a signal comes in at one port, it is sent out on the relevant transmit line on the other port, and vice versa. Regarding the manner in which the processors 11 are programmed to generate the relevant structures, the following describes this in more detail. The following is the format for an outgoing signal:

*<rel><irel><dly><key><cks><DGA><seq><type> <len><data><cks>*

The <rel><irel><dly><key><cks> string forms a header for the outgoing signal. The remainder may be regarded as a control frame.

Header

<rel>2 Bytes. These bytes specify the addressee or echo node location. Each node decrements this field as it passes through, the node that receives an addressee value of 01 recognizes that it is the addressee.

<irel>2 Bytes. This is the inverse of the <rel>field and is incremented as it passes each node. It is used as a check for corruption of the <rel>field as the sum <rel>+ <irel>should always be zero. If a node receives a start of frame with a non-zero sum then transmission should be aborted and an error recovery procedure instigated.

<dly>1 Byte. Range 0–FF. This specifies the turnaround delay in 10's of ms. The echo node will wait this period after receiving an outgoing signal before sending a return signal. This is to allow other nodes on the return path to generate a response before the return signal is initiated.

<key>1 Byte. Range 0–FF. This is an encryption key. A value of zero indicates no encryption.

<cks>1 Byte. Checksum.

Control Frame

<DGA>2 Bytes. Range 0–FFFF. This is a destination group address and specifies the group of nodes for which the message is intended. Only nodes corresponding to this group can generate information frames for a return signal, however, an addressee node need not always generate a response (this is dependent on application protocol). The DGA value 0 specifies the echo node as the only valid node, while the DGA value FFFF specifies all intervening nodes as valid.

<seq>1 Byte. Range 0–7F. This is a sequence number and allows a node to identify a retry. If a node receives a control frame with the same sequence number as the previous frame it must send the same response as previously generated. This allows recovery from lost control or information frames. The sequence number FF is reserved for internal use by the nodes.

<type>1 Byte. Range 0–FF. Application type specifier.

<len>2 Bytes. Range 0–FFFF. This specifies the number of Bytes in the data stream to follow.

<data>This is the data stream.

<cks>1 Byte. Range 0–FF. Checksum. The arithmetic sum of all bytes in the frame from <dly>to <cks>inclusive should add up to zero. A node receiving a control frame with an invalid checksum should not generate a response.

The return signal has a header similar to that of the outgoing signal, the relative address <rel>having a fixed value of 0. The following is the format of the information frame which follows the header:

*<ser><type><len><data><cks>*

<ser>4 Bytes. Range 0–FFFFFFFF, serial number or identifier of echo node. This is unique to a node and is used by the master node to identify the echo node.

<type>1 Byte. Range 0–FF. This specifies the reply type of the information frame.

<len>2 Bytes. Range 0–FFFF. This specifies the number of bytes in the following data stream.

<data>This is the data stream.

<cks>1 Byte. Range 0–FF. Checksum. The arithmetic sum of all bytes <ser> to <cks> inclusive should be zero. If a node receives a frame with an invalid checksum, it should immediately abort re-transmission and instigate a recovery procedure.

The following is an example of an outgoing signal.

*<0004><FFFC><10><0><E><FFFFFFFF><45><0><0,0><ac>*

| | |
|---|---|
| <rel> = 0004 | Echo node is fourth node out |
| <irel> = FFFC | Verification |
| <dly> = 10 | Echo node to wait 100 mS before transmission of return signal |
| <key> = 0 | No encryption |
| <group> = FFFFFFFF | All nodes "addressed" |
| <seq> = 45 | Control frame sequence number |
| <type> = 0 | NULL Message |
| <length> = 0 | No data field to follow |
| <cks> = ac | Confirm valid frame |

It will be appreciated that there is a large degree of flexibility provided by the message structures. For example, the <DGA>field controls the extent of data retrieval in a simple manner. The <irel> field and its dynamic updating help to provide for immediate error\noise detection. The <dly> field helps to ensure data may be retrieved from all required nodes.

Figure 3:
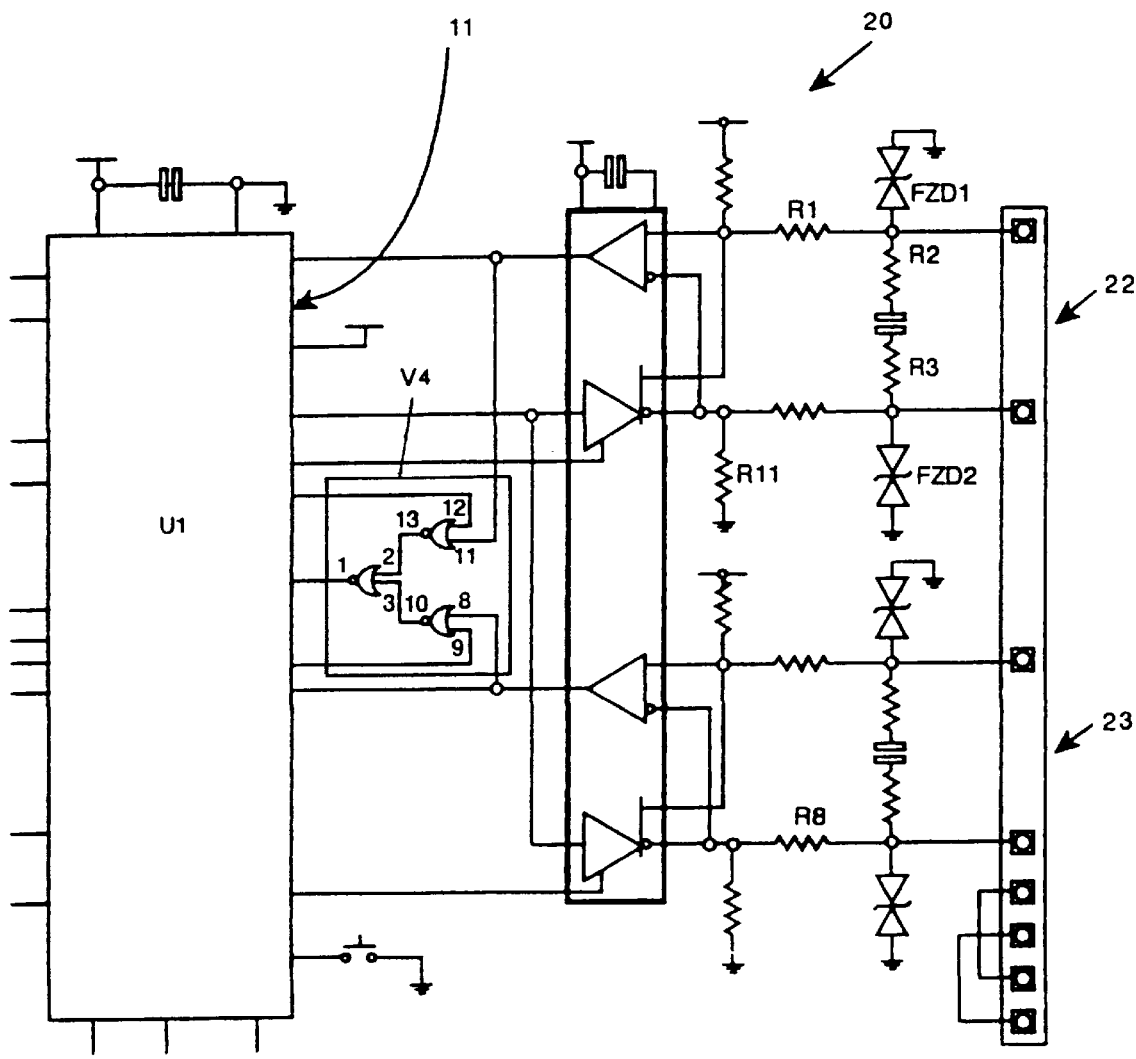
FIG. 3 is a circuit diagram showing a processing and communication circuit of an alternative construction of node of the invention.

Referring now to FIG. 3, an alternative construction of processing and communication circuit 20 for nodes of a system of the invention is illustrated. This is a simpler embodiment having a processor 21 or U1 which is of the Intel 8052™ type. RS232 ports 22 and 23 are connected to serial port pins on the processor 21 in which the direction is determined by a circuit (U4) and avoids the need for separate dedicated serial ports as in the first-described embodiment. While the circuit 20 is not as good at discriminating noise when it appears at one input port while a signal is being received at the other, it is very effective for lower-cost systems as the processor 21 is simpler and less expensive than the processor 11 of the first embodiment. It should be noted that in this embodiment, the return signal is terminated with a single 0 Byte so that the successive nodes on the return path can identify the end of the information frame. The 0 Byte is appended by the addressee node. Such a Byte is not required in the first embodiment by the processor 11 as this has a greater data processing capability.

It will be appreciated that the invention provides for very easy configuration and modification of a ring network. This is because the master node does not need to know the identifier of a new node which is added. All that is required is for the new node to be programmed with this identifier and for it to be installed in the network. The master node may then perform automatic configuration by polling all nodes and retrieving their identifiers and storing these. The important point is that the master node does not need to include any identifiers in its outgoing signals. By virtue of the fact that each node in turn decrements the relative address, this address is always relevant as it indicates at any time the relevant position of the addressee node with respect to the latest node which it has passed through. It may thus be said that the relative address is dynamically maintained. Further, because each node in turn is only checked to see if the relative address has a fixed addressee value (1 in the embodiments described), the reading and decrementing operations may be carried out very quickly. These operations are also quite simple and accordingly there is no need for each node to have complex circuitry. Speed of retrieval of data which is captured at the various nodes is also considerably enhanced by the fact that the return signal has captured data added to its data stream on the return path. Therefore, data can be retrieved from all desired nodes between the sender and addressee nodes in response to a single outgoing signal. Because the buffer amp. U1 effectively repeats the signal by restoring it to its correct format, the network may be used over a large physical area and indeed there may be up to 1 km between each node.

The invention is not limited to the embodiments hereinbefore described. For example, it is envisaged that any suitable data processing circuit may be used, depending on the nature of the processing required. While the invention is primarily directed to control systems such as alarm, building management, or lighting control systems, it is also envisaged that it may be used for more intensive data processing applications.

The invention is not limited to the embodiments hereinbefore described, but may be varied in construction and detail.

We claim:

1. A ring network system comprising:
    a plurality of nodes, each node comprising means for capturing data;
    communication links interconnecting the nodes in a ring configuration;
    control means in at least one sender node comprising means for:
        transmitting an outgoing signal to an addressee node, said signal having a relative address determined according to the relative location of the addressee node in the ring network, and
        receiving a return signal from the addressee node and reading an addressee node identifier and captured data incorporated in the return signal;
    data transfer means in each node comprising means for:
        receiving an outgoing signal, monitoring the relative address, and determining if it is the addressee node,
        re-transmitting the outgoing signal to a next node if it is not the addressee node,
        in response to reception of the outgoing signal, generating a return signal including captured data and transmitting said return signal to the sender node on a return path in the opposite direction to that of the received outgoing signal through nodes of the system if it is the addressee node, said return signal incorporating the identifier of the addressee node,
        receiving a return signal and determining that it is a return signal, and
        adding captured data and the node identifier to said signal and re-transmitting the signal to a next node on the return path.

2. A ring network system as claimed in claim 1, wherein the data transfer means of each node comprises:
    means for changing the relative address of an outgoing signal before re-transmitting it to the next node whereby the relative address is dynamically maintained; and
    means for determining if the node is the addressee node if the relative address has a pre-set common addressee value.

3. A ring network system as claimed in claim 1, wherein the relative address is a count value, and the data transfer means of each node comprises means for:
    receiving a signal and determining according to the count value if said signal is an outgoing signal, and determining if the node is the addressee node if the count value has a pre-set common addressee value; and
    if the signal is an outgoing signal and the node is not the addressee node, changing the count value in a pre-determined manner and re-transmitting the signal to the next node.

4. A ring network system as claimed in claim 3, wherein the data transfer means comprises means for changing the count value by decrementing it.

5. A ring network system as claimed in claim 1, wherein the data transfer means comprises means for determining that a received signal is a return signal if the relative address has a pre-set common return signal value.

6. A ring network system as claimed in claim 1 wherein the control means comprises:
    means for transmitting a polling signal to every node location of the system using said relative addresses;
    means for monitoring return signals from the nodes and reading the identifiers in said return signals; and
    means for updating a table in a non-volatile memory correlating node locations with identifiers, whereby automatic configuration of the system takes place.

7. A ring network system as claimed in claim 6, wherein the control means comprises means for automatically performing said automatic configuration operations upon detection of a fault.

8. A ring network system as claimed in claim 1, wherein the control means comprises means for transmitting different outgoing signals in opposite directions to omit a communication link to assist in fault detection.

9. A ring network system as claimed in claim 8, wherein the control means comprises means for:
    sequentially omitting communication links in order around the system in successive outgoing signal cycles; and
    monitoring the return signals and carrying out fault diagnosis processing based on data in said return signals.

10. A ring network system as claimed in claim 1 wherein said data transfer means comprises a signal repeater buffer amplifier.

11. A ring network system as claimed in claim 1, further comprising a remote infra-red user interface, and an infra-red module in the data transfer means of each node programmed to transmit node status information to the user interface when requested.

* * * * *